(12) United States Patent
Wendig et al.

(10) Patent No.: US 8,720,178 B2
(45) Date of Patent: May 13, 2014

(54) COMPONENT FOR A LINE ROUTING SYSTEM INCLUDING AT LEAST ONE LINE ROUTING DEVICE, AS WELL AS A CORRESPONDING LINE ROUTING DEVICE AND LINE ROUTING SYSTEM

(75) Inventors: Thomas Wendig, Katzwinkel/Elkhausen (DE); Werner Eul, Troisdorf (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 9 days.

(21) Appl. No.: 13/480,041

(22) Filed: May 24, 2012

(65) Prior Publication Data

US 2012/0304616 A1     Dec. 6, 2012

(30) Foreign Application Priority Data

May 30, 2011   (DE) .................... 20 2011 101 573 U

(51) Int. Cl.
*F16G 13/16*   (2006.01)

(52) U.S. Cl.
USPC ............................... 59/78.1; 248/49; 248/51

(58) Field of Classification Search
USPC ......... 59/5, 78, 78.1, 93; 474/207; 248/49, 51
See application file for complete search history.

(56) References Cited

U.S. PATENT DOCUMENTS

| | | | | |
|---|---|---|---|---|
| 4,854,558 A | * | 8/1989 | Newton | 267/74 |
| 5,771,676 A | * | 6/1998 | Komiya et al. | 59/78.1 |
| 5,809,767 A | * | 9/1998 | Tanaka | 59/5 |
| 5,943,855 A | * | 8/1999 | Morimoto et al. | 59/5 |
| 6,173,560 B1 | * | 1/2001 | Weber | 59/78.1 |

FOREIGN PATENT DOCUMENTS

| | | |
|---|---|---|
| DE | 2517007 A1 | 4/1975 |
| DE | 3437840 A1 | 10/1984 |
| DE | 10162066 A1 | 12/2001 |
| DE | 102004007891 A1 | 2/2004 |
| EP | 0415029 A2 | 3/1991 |
| EP | 1481033 B1 | 5/2008 |
| EP | 2290020 A1 | 3/2011 |
| WO | 9822728 A1 | 5/1998 |

* cited by examiner

Primary Examiner — David B Jones
(74) Attorney, Agent, or Firm — BainwoodHuang

(57) ABSTRACT

A component for a line routing system including at least one line routing device having at least one section of the surface of the component that is flocked. The component of line routing device is at least one of a chain link, a chain link plate of a chain link, a transverse web of a chain link, a cover of a chain link, a dividing web of a chain link, a guide element, a housing, a line, and a hose.

22 Claims, 4 Drawing Sheets

COMPONENT FOR A LINE ROUTING SYSTEM INCLUDING AT LEAST ONE LINE ROUTING DEVICE, AS WELL AS A CORRESPONDING LINE ROUTING DEVICE AND LINE ROUTING SYSTEM

CROSS-REFERENCE TO RELATED APPLICATIONS

This Patent Application claims priority to German Patent Application No. 20 2011 101 573.8 filed on May 30, 2011, entitled, "Component for a line routing system comprising at least one line routing device, as well as a corresponding line routing device and line routing system", the contents and teachings of which are hereby incorporated by reference in their entirety.

The subject of the present invention is a component for a line routing system including at least one line routing device, such as, for instance, a power cable chain. The component can thus be constituted by a part of the line routing device itself, such as a chain link, a chain link plate, a transverse web or a dividing web, but can also be constituted by a component of further elements of the line routing system, such as, for instance, components of a housing, of a guide duct or of a storage trough for a line routing device, or by the guided lines, hoses or the like.

Line routing devices, such as, for instance, power cable chains, are often used to guide cables, lines, hoses or the like between a fixed and a movable connection point or between two movable connection points. The line routing device is often formed by a plurality of chain links, which are articulately connected to one another. Each chain link has two chain link plates. The link plates are connected to each other by at least one transverse web or a cover. The chain link plates and the transverse webs form a duct in which the hoses, cables, lines or the like are disposed.

During operation, the line routing device moves, and rolls either on itself or on corresponding faces, guide faces or guide elements, such as, for instance, in guide ducts, guide channels, storage troughs or in a housing. Noises are hereupon generated, which noises, according to the use of the line routing system, are undesirable, or in respect of which predefined limit values for the operating noises must be observed. From the prior art, approaches are known with which the noise development during rolling of the power cable chain can be reduced. Thus EP-A-0 415 029, for instance, discloses a system in which guide shoes can be placed onto the chain link plates of the power cable chain, the guide shoes being formed from a slidable and wear-resistant plastics material having good damping characteristics. The guide shoes according to this printed publication have a planar surface structure, i.e. the rolling on the guide shoes is effected on the whole of the surface of the guide shoe. Starting therefrom, a further noise reduction option has been disclosed in WO-A-98/22728. From this printed publication it is known to provide, instead of the guide shoes, by means of a multi-component injection moulding process, an inlay which consists of an insulating plastics material and which is moulded directly onto the chain link plates or the transverse webs.

Despite these solutions known from the prior art, there are situations in which these methods are unusable or in which the use of the corresponding methods is undesirable. Starting from here, the object of the present invention is to propose a line routing system in which good sound insulation, combined with simultaneously low production cost, is possible.

This object is achieved by a component having certain features and advantageous refinements which are disclosed herein.

The features which are individually described herein can be mutually combined in any chosen, technologically sensible manner and can be supplemented by elucidating facts from the description, in which case further construction variants of the invention are revealed.

A component for a line routing system including at least one line routing device is distinguished by the fact that at least one section of the surface of the component is flocked, i.e. has a flocking.

By a line routing system is understood a system with which cables, lines, hoses or the like can be guided between a fixed and a movable connection point. The line routing system necessarily has at least one line routing device, such as, for instance, a power cable chain. This line routing device can be designed such that it runs down on itself, i.e. during operation forms an upper strand and a lower strand, which roll one upon the other. In addition, the line routing device can also be designed such that it is stored in or on a guide element. This guide element can comprise, for instance, a guide duct, a guide channel, a housing, a storage channel or a storage trough for a line routing device. The line routing system according to the present invention thus comprises in addition to the line routing device, where necessary, at least one guide face, a housing, a guide duct, a storage trough or the like.

The line routing device is formed, for instance, by a plurality of chain links, which are articulately connected to one another. Each chain link has at least one, preferably two chain link plates. The chain link plates are connected to one another by at least one transverse web or a cover. Chain link plates and transverse webs form a duct, in which the hoses, cables, lines or the like are disposed. The inventive components can particularly preferably be used in line guide systems in which at least parts of the chain links, and here, in particular, the surfaces of the chain links, are formed from a plastic and/or a metal, such as, for instance, steel, aluminium and similar.

By a component of a line routing system is understood a part or element of the line routing system, thus, for instance, the line routing device and/or parts thereof, a guide element and/or parts thereof, a housing and/or parts thereof, as well as the guided elements, thus, in particular, lines, hoses or the like. The flocking is effected, according to the invention, at least in a section of the surface of the component, though a full-face flocking is also possible according to the invention.

By flocking is understood a coating of—preferably short—fibres, the so-called flock fibres. These are applied, for instance by so-called electrostatic flocking, in an electric field to the surfaces to be flocked, which surfaces are coated with an adhesive. The electrostatic field ensures an alignment of the flock fibres.

In contrast to the solutions which are known from the prior art and have been discussed above, the sound insulation is thus not realized through damping by a planar damping element having a single planar surface, but rather the flocked regions have a fibrous surface and should preferably be construed as a type of brush or sponge. The flocking preferably has a height of less than one millimeter, in particular of less than half a millimeter, or even in the region of a height of one-tenth of a millimeter and less. Such flockings have a low frictional resistance, which makes it easier for them to slide over the component, such as, for example, a chain link of a line routing device, or else a line, a hose or similar. The noise development and the frictional resistance, as well as the abrasion of the components during operation of the chain, is thereby significantly reduced.

Preferably, the flocking is configured in the regions of the component in which friction with other components can arise during operation. This can concern friction through the movement of lines, hoses or similar relative to a chain link or a part of the chain link, but can also concern the movement of a chain link on a base surface, for instance another chain link or a guide element, or the movement of the lines, hoses or similar elements of the line routing system which are to be guided. The inventive component allows the construction of line routing systems which, in comparison to uninsulated systems, can be operated with a markedly reduced noise development. The line routing system is in this case easy and cheap to construct.

According to an advantageous refinement of the inventive component, the component comprises at least one of the following elements:
 a) a chain link of the line routing device;
 b) a chain link plate of a chain link of the line routing device;
 c) a transverse web of a chain link of a line routing device;
 d) a cover of a chain link of a line routing device;
 e) a dividing web of a chain link of a line routing device;
 f) a housing for a line routing device;
 g) a guide element for a line routing device;
 h) a line; and
 i) a hose.

A chain link of a line routing device usually has at least one, preferably two chain link plates, which are configured parallel to each other and which are connected to each other by at least one transverse web, so that a substantially U-shaped cross section is obtained. The chain link can be configured in one piece, i.e. the two chain link plates and the at least one transverse web can be configured in one piece or moulded together, though it is also possible for the chain link plate and the transverse web to be detachably connected to each other, for instance by a snap-lock connection or a latching connection. By a cover of a chain link is understood an element which closes off the chain link on one side and, in particular, extensively covers it, so that, in the assembly of the line routing device, no open regions are present under the cover. By a dividing web of a chain link is understood a web which splits the interior of the chain link into different regions, for instance into two regions. A plurality of dividing webs of different orientation can be combined in a chain link. Dividing webs serve, in particular, for the mounting and guidance of the lines, hoses, or the like inside the line routing device.

In addition, the component can also constitute a guide element for a line routing device, by means of which a guidance of the line routing device during operation is ensured. This can be in the form of a guide duct or a part of a guide duct, a guide channel or a part of a guide channel, or else a housing or a part of a housing for a line routing device. By a housing is understood, in particular, a container which is wholly or predominantly sealed against the environment and in which the line routing device, during operation, is received.

By a guide duct is here understood, in particular, a guide element which has at least one side wall whose height is greater than at least 50% of the corresponding height of a chain link of a line routing device. In the case of a guide channel, the height can be less. In the case of a guide channel, the upper strand of the chain thus does not necessarily have to be guided. By a store, which can constitute, in particular, a storage channel or a storage trough, is understood a container in which can roll the line routing device, yet in which there is no further, in particular lateral, guidance of the line routing device. In addition, it is preferred if at least one line and/or one hose and the like, in at least one section of the surface, are flocked. As a result, the internally generated noises can also be damped.

In the case of a line routing device which is not constructed from individual chain links, but which is constructed, for instance, in one piece including a plurality of elements, the line routing device is understood as such, or the element is understood as a component within the meaning of this invention.

In principle, it is preferred that those sections of the surface of the corresponding component which, during operation, make contact with other elements and/or which, during operation, move relative to another component or element are flocked. The noises of the line routing device or of the line routing system which are generated during operation can thus be effectively damped.

According to a further advantageous embodiment, the flocking comprises fibres, which flocking fulfils at least one of the following specifications:
 A) a fibre diameter within the range from 10 µm to 50 µm;
 B) a fibre length within the range from 0.3 to 3.0 mm; and
 C) a specific fibre weight within the range from 1 dtex to 22 dtex.

Embodiments having diameters from 11 µm to 50 µm, combined with a specific fibre weight from 1 dtex to 22 dtex with lengths of 0.3 to 3.0 mm, are preferred. Where necessary, the fibres can be dyed by the addition of carbon black within the range from 1.1 to 2 percent by weight. By the unit dezitex (dtex) is understood the specific fibre weight of the fibres measured in grams per 10,000 meters. Alternatively, the option exists of using fibres with diameters ranging between 10 µm at 1 dtex and 45 µm at 22 dtex with lengths of 0.3 to 3.0 mm. These fibres, too, can be coloured black by the addition of about 2-3 percent by weight carbon black pigment.

According to a further advantageous embodiment, the flocking comprises at least one of the following materials:
 i) a polyester;
 ii) polyethylene terephthalate (PET); and
 iii) a polyamide.

The use of fibres of these materials has proved particularly advantageous, since these are abrasion-resistant, simple to produce and are easy to apply as flocking. The abrasion resistance, in particular, has proved important, since this ensures that, even in continuous operation of the corresponding line routing systems, the abrasion does not exceed tolerable dimensions.

According to a further advantageous embodiment of the inventive component, the flocking is configured in that section of the surface which, during operation of the line routing device, comes into contact with another part.

These are, in particular, the rolling and/or sliding faces of the individual chain links, the guide faces of the guide elements and those regions inside the line routing device which come into contact with the guided elements, such as, for instance, lines, hoses and the like.

According to a further advantageous embodiment, the flocking is applied by means of an adhesive including at least one of the following substances:
 I) xylene;
 II) 2-methoxy-1-methyl-ethyl acetate;
 III) glycolic acid-n-butyl ester; and
 IV) naphtha.

An adhesive including at least one of these substances I) to IV) has proved particularly advantageous. An embodiment in which all four of these substances are jointly included in the adhesive is particularly preferred.

In addition, a line routing system including at least one inventive component is proposed.

In addition, a line routing device including at least one inventive component and a guide element for a line routing device including at least one inventive component is proposed.

Various embodiments are explained in greater detail below with reference to the appended figures, without the embodiments being limited to the details and features which are shown there. In schematic and illustrative representation:

FIG. 6 shows a cross section of an inventive flocked line, hose or the like.

Figure 1:
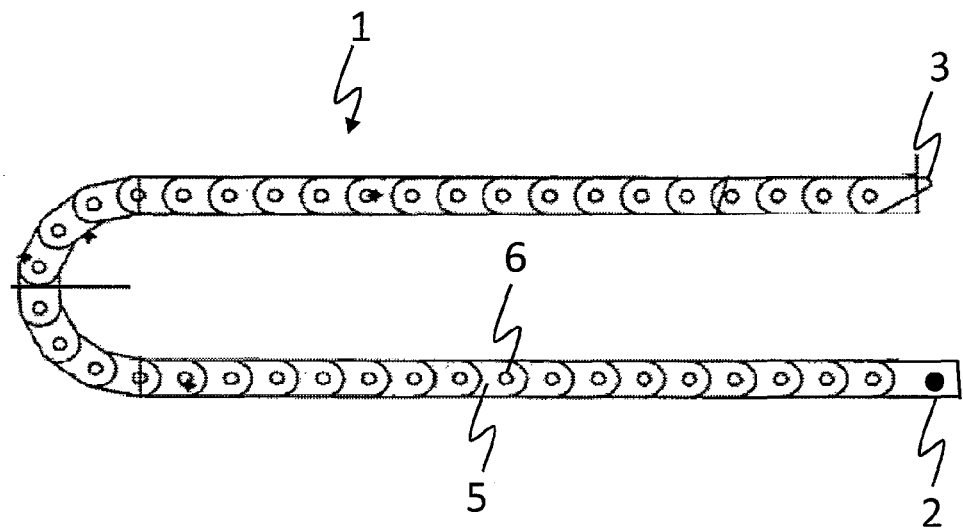
FIG. 1 shows a first illustrative embodiment of a line routing device.

FIG. 1 shows schematically a first illustrative embodiment of a line routing device 1 in side view. This line routing device 1 serves to guide cables, lines, hoses and the like in its interior between a first connection point 2 and a second connection point 3. In this illustrative embodiment, the first connection point 2 is fixed, whilst the second connection point 3 is movable. It is likewise possible for both the first connection point 2 and the second connection point 3 to be made movable. In the present illustrative embodiment, the second connection point 3 is configured on a machine (not represented in detail), so that the latter is supplied via the line routing device 1, for instance, with current, control signals, compressed air, water, consumable material, suction, etc., and data can also correspondingly be transmitted from the machine. The line routing device 1 is formed from components, namely chain links 5 including a plastics material. The plastics material is constituted, in particular, by a glass fibre reinforced plastic.

During operation of the line routing device 1, the second connection point 3 is moved in relation to the first connection point 2. This leads to a rolling movement of the line routing device 1. The line routing device 1 is formed by individual chain links 5. These chain links 5 are connected to one another by corresponding pins 6. Adjacent chain links 5 can be mutually pivoted. This illustrative embodiment of a line routing device 1 can be constructed, for instance, from chain links according to FIGS. 2, 3 and 7.

Figure 2:
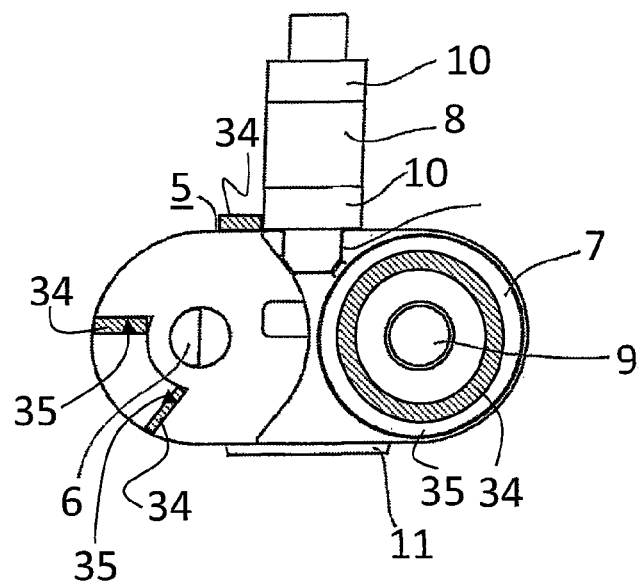
FIG. 2 shows a view of a first illustrative embodiment of an inventive chain link of the first illustrative embodiment of a line routing device.

FIG. 2 shows schematically a first illustrative embodiment of a chain link 5. A chain link 5 respectively comprises two chain link plates 7. These chain link plates 7 are configured parallel to one another and are connected to one another by at least one transverse web 8. Each chain link plate 7 has, in addition to the pin 6, also a corresponding borehole 9. The pin 6 and borehole 9 of the chain link plate 7 are configured such that adjacent chain link plates 7 can be connected to one another by insertion of the pin 6 into the borehole 9. The transverse webs 8 can be configured such that they are pivotable with respect to the chain link plate 7 or such that they are fixedly connectable or connected to this same. In the present illustrative embodiment, the chain link 5 has in the region of the transverse web 8, according to the invention, first flockings 10, in which, if a line routing device 1 is not guided by a guide device such as a guide channel, the upper strand can rest on the lower strand of the line routing device.

In addition, the chain link plate 7 has second flockings 11, by means of which the line routing device 1 is movable on a correspondingly configured guide device or an underlying part of the line routing device 1.

Moreover, the chain link plate 7 according to FIG. 2 has sixth flockings 34, which are here configured in the region of the stops 35 which limit the deflection of second, adjacent chain link plates 7 in a line routing device 1, as well as on the top side of the chain link plate 7 and in the connecting region 36, in which a connection to an adjacent chain link plate 7 can be established. The sixth flockings 34 can respectively also be configured individually, so that, for instance, only the sixth flockings 34 are configured in the region of the stops 36 of the chain link plate 7.

Figure 3:
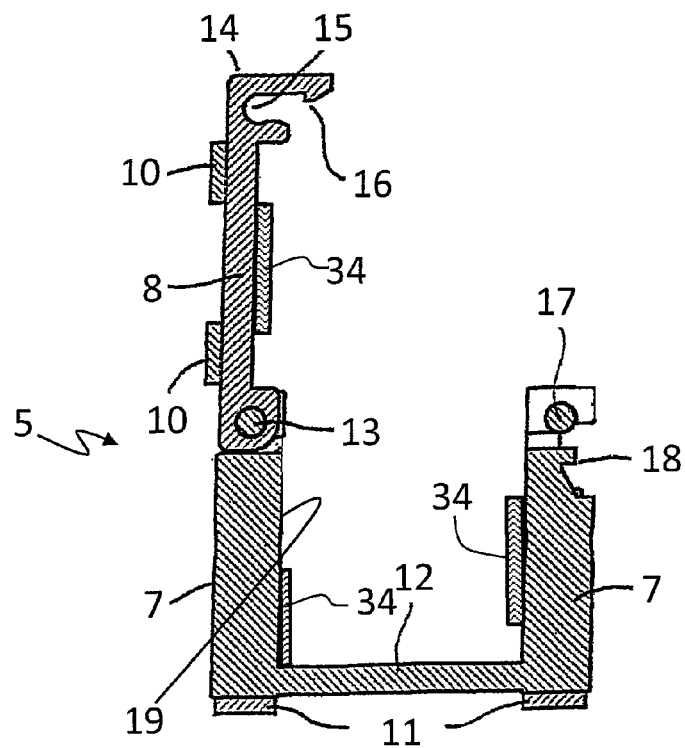
FIG. 3 shows a view of a second illustrative embodiment of an inventive chain link of an inventive line routing device.

FIG. 3 shows schematically a second illustrative embodiment of a chain link 5 for the construction of a line routing device 1. This chain link 5 has a moulded-on lower transverse web 12, as well as a pivotable cover 4. The pivotable cover 4 is pivotable about a bolt 13. The opposite connecting end 14 of the cover 4 has a bolt receptacle 15 and a latch boss 16. In addition, the chain link 5 has a bolt 17, which is configured correspondingly to the bolt receptacle 15. In addition, a projection 18 is configured, which projection corresponds with the corresponding latch boss 16. The chain link 5 defines a receiving space 19, in which cables, lines, hoses and the like can be guided. This receiving space 19 can be delimited by closure of the upper pivotable cover 4, so that loss of the guided cables, lines, hoses and the like can be prevented. The cover 4 has two regions having a first flocking 10, with which regions the line routing device 1 rolls on another line routing device 1 or on another region of the same line routing device 1. In addition, the chain link 5 has two regions including a second flocking 11, with which regions the line routing device 1 composed of corresponding chain links 5 rolls on a guide element (not shown here). FIG. 3 further shows sixth flockings 34, which are configured on the inner side of the transverse web 8, as well as on the inner side of the chain link plates 7. In principle, it is possible according to the invention, for instance, to provide inner and/or outer faces, top and/or bottom sides, sliding, connecting and/or stop faces of chain link plates 7 with flockings.

Figure 4:
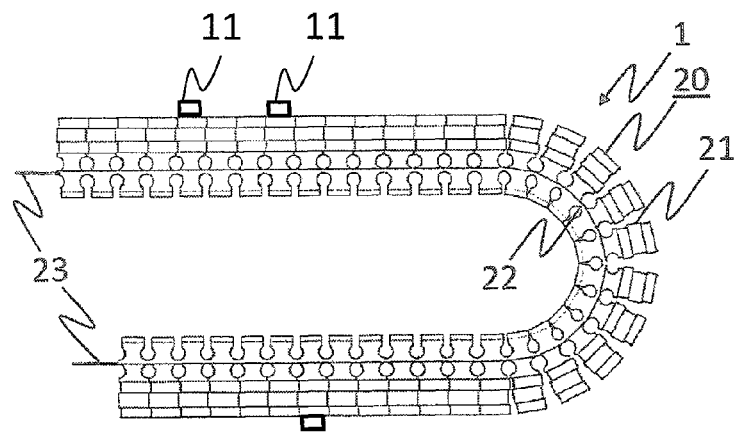
FIG. 4 shows a side view of a second illustrative embodiment of an inventive line routing device.

FIG. 4 shows an element 20 of a second illustrative embodiment of an inventive line routing device 1, which is not formed from individual chain links, but which is formed from a plastics material in one piece. As a result of appropriate indentations 21 and pivot axles 22, the appropriate deflectability of the line routing device 1 is given. The second illustrative embodiment of a line routing device 1 can be formed by a single corresponding element 20 or a plurality of mutually connected elements 20.

The element 20 is formed from a plastics material. The element 20 further comprises a tension element 23, which is formed from wire. The element has regions including a second flocking 11, which regions, for the sake of clarity, are shown on a purely illustrative basis. The regions of the second flocking 11 can extend over the whole of the element 20, whilst it is also possible to provide just single regions between two pivot axles 21 with a second flocking 11.

Figure 5:
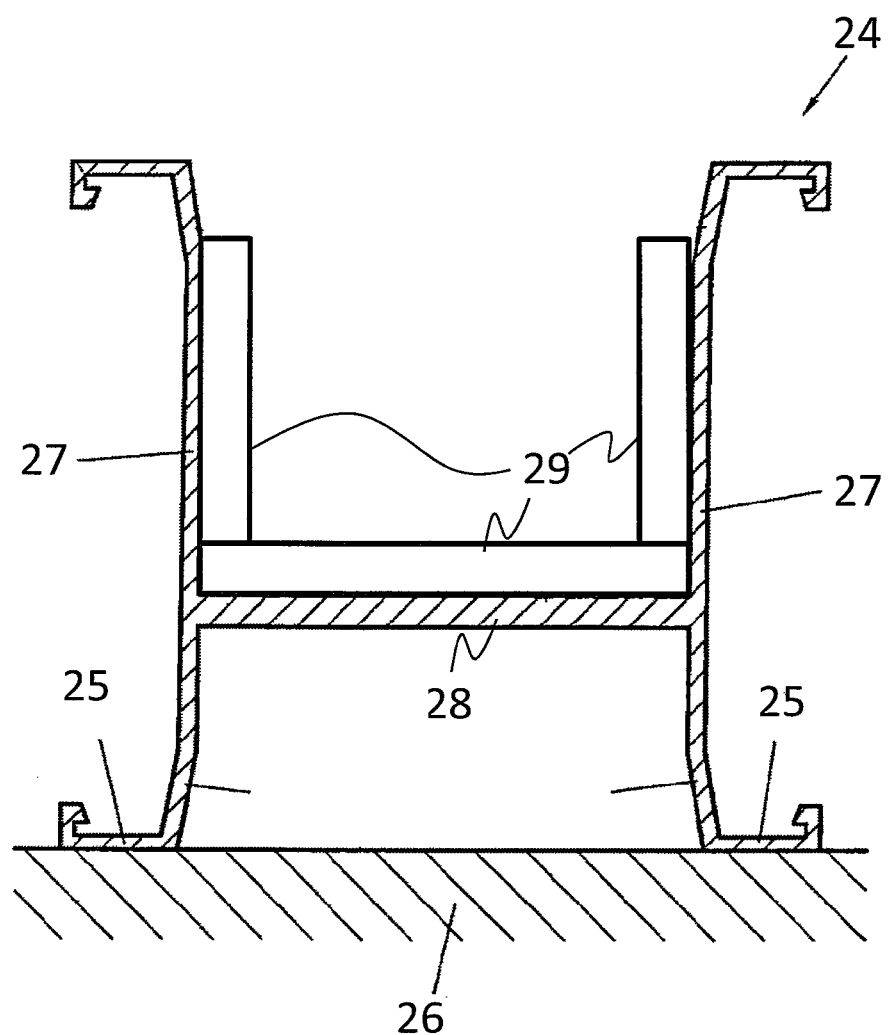
FIG. 5 shows a cross section of an inventive guide element.

FIG. 5 shows schematically a guide element 24 for a line routing device. The guide element 24 is fastened with fastening elements 25 on a base surface 26. It has two side walls 27 for the lateral guidance of a line routing device 1 (not shown), which rolls on a support 28. The support 28 is at least partially provided with a third flocking 29, on which the line routing device 1 rolls. The side walls 27 are also provided with a third flocking 29, which reduces the frictional resistance between the line routing device and the side walls 27. In addition, it is possible according to the invention to provide the surface of sliding and rolling elements (not shown here) configured in guide elements 24 at least partially with a flocking. In addition, a full-face flocking of these elements is also possible.

Figure 6:
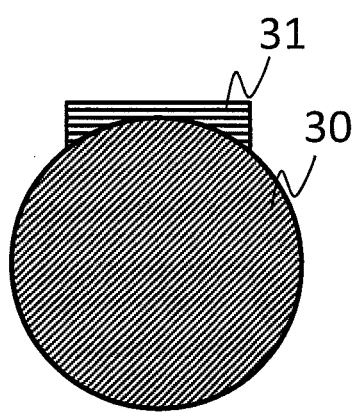

FIG. 6 shows schematically a line 30, which is provided with a fourth flocking 31. As a result of the fourth flocking 31, the noise development during rolling of the line 30 is damped. In addition to a configuration of the fourth flocking 31 in a section of the surface of the line 30 (which can also constitute a hose or the like, generally a guided element) as is shown in FIG. 6, a circumferential fourth flocking 31 is also possible according to the invention.

Figure 7:
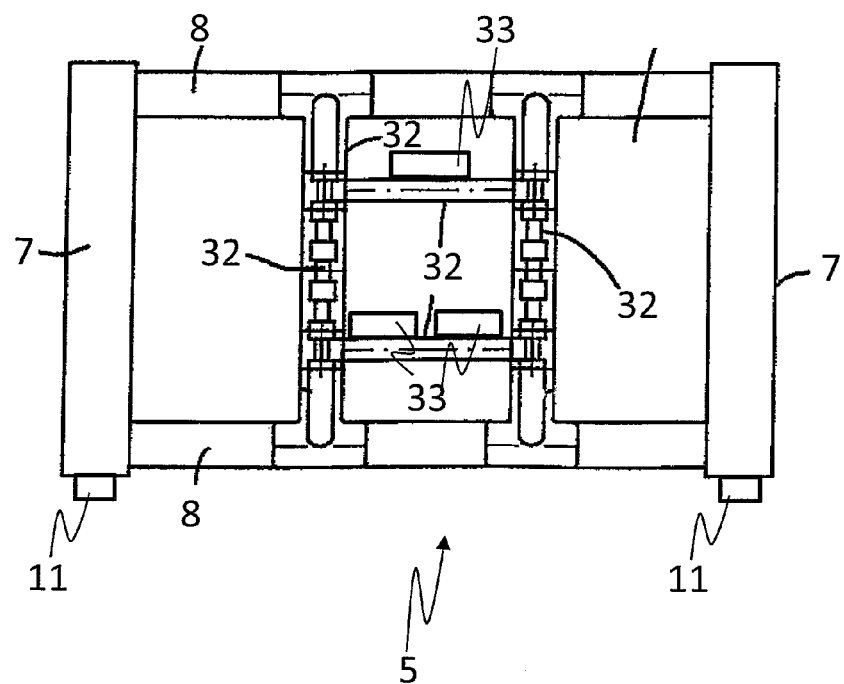
FIG. 7 shows a cross section of a third illustrative embodiment of an inventive chain link of a line routing device.

FIG. 7 shows a cross section of a chain link 5, constructed from two chain link plates 7 and two transverse webs 8. In addition, this illustrative embodiment of a chain link 5 has horizontal and vertical dividing webs 32, which in some areas are provided with a fifth flocking 33. This damps the noise development caused by relative movements of the lines, hoses or the like (not shown here). In addition, this chain link 5 has a second flocking 11, which damps the noises associated with rolling of the line routing device 1 constructed from such chain links 5.

The inventive components for a line routing system including at least one line routing device 1 are distinguished by the fact that particularly those parts which, during operation, move relative to other components and come into contact with these have in this region of their surface a flocking 10, 11, 29, 31, 33 which damps noise development. The component can, in particular, constitute a chain link 5, a chain link plate 7, a transverse web 8, 12, a guide element 24 for a line routing device 1, a line 30 or a hose or the like, or a dividing web 32. According to the invention, line routing systems including at least one such component and line routing devices 1, such as power guide chains, including at least one such component are also possible.

REFERENCE SYMBOL LIST 1 line routing device
2 first connection point
3 second connection point
4 cover
5 chain link
6 pin
7 chain link plate
8 transverse web
9 borehole
10 first flocking
11 second flocking
12 moulded-on transverse web
13 bolt
14 connecting end
15 bolt receptacle
16 latch boss
17 bolt
18 projection
19 receiving space
20 element
21 indentation
22 pivot axis
23 tension element
24 guide element
25 fastening element
26 base surface
27 side wall
28 support
29 third flocking
30 line
31 fourth flocking
32 dividing web
33 fifth flocking
34 sixth flocking
35 stop
36 connecting region

The invention claimed is:

1. A component for a line routing system comprising at least one line routing device, wherein at least one section of a surface of the component has a flocking;
   wherein the flocking comprises fibres, which flocking fulfils at least one of the following specifications:
   A) a fibre diameter within the range from 10 µm to 50 µm;
   B) a fibre length within the range from 0.3 to 3.0 mm; and
   C) a specific fibre weight within the range from 1 dtex to 22 dtex.

2. The component according to claim 1, in which the flocking comprises at least one of the following materials:
   i) a polyester;
   ii) polyethylene terephthalate (PET); and
   iii) a polyamide.

3. The component according to claim 1, in which the flocking is applied by means of an adhesive comprising at least one of the following substances:
   I) xylene;
   II) 2-methoxy-1-methyl-ethyl acetate;
   III) glycolic acid-n-butyl ester; and
   IV) naphtha.

4. The component according to claim 1, in which the flocking is configured in that section of the surface which, during operation of the line routing device, comes into contact with a part of the line routing system.

5. A chain link for a line routing system, comprising two spaced-apart, mutually oppositely disposed chain link plates and at least one transverse web connected to the chain link plates, wherein at least one section of a surface of the chain link has a flocking.

6. A chain link according to claim 5, further including a dividing web.

7. A chain link according to claim 5, wherein the flocking comprises fibres, which flocking fulfils at least one of the following specifications:
   A) a fibre diameter within the range from 10 µm to 50 µm;
   B) a fibre length within the range from 0.3 to 3.0 mm; and
   C) a specific fibre weight within the range from 1 dtex to 22 dtex.

8. A chain link according to claim 5, wherein the flocking comprises at least one of the following materials:
   i) a polyester;
   ii) polyethylene terephthalate (PET); and
   iii) a polyamide.

9. A chain link according to claim 5, wherein the flocking is applied by means of an adhesive comprising at least one of the following substances:
   I) xylene;
   II) 2-methoxy-1-methyl-ethyl acetate;
   III) glycolic acid-n-butyl ester; and
   IV) naphtha.

10. A chain link for a line routing system, comprising two spaced-apart, mutually oppositely disposed chain link plates and at least one cover connected to the chain link plates, wherein at least one section of a surface of the chain link has a flocking.

11. A chain link according to claim 10, further including a dividing web.

12. A chain link according to claim 10, wherein the flocking comprises fibres, which flocking fulfils at least one of the following specifications:
   A) a fibre diameter within the range from 10 μm to 50 μm;
   B) a fibre length within the range from 0.3 to 3.0 mm; and
   C) a specific fibre weight within the range from 1 dtex to 22 dtex.

13. A chain link according to claim 10, wherein the flocking comprises at least one of the following materials:
   i) a polyester;
   ii) polyethylene terephthalate (PET); and
   iii) a polyamide.

14. A chain link according to claim 10, wherein the flocking is applied by means of an adhesive comprising at least one of the following substances:
   I) xylene;
   II) 2-methoxy-1-methyl-ethyl acetate;
   III) glycolic acid-n-butyl ester; and
   IV) naphtha.

15. A line routing device, comprising a plurality of chain links including two spaced-apart, mutually oppositely disposed chain link plates and at least one transverse web connected to the chain link plates, wherein at least one section of a surface of the chain link has a flocking.

16. A line routing device according to claim 15, wherein the flocking comprises fibres which fulfil at least one of the following specifications:
   A) a fibre diameter within the range from 10 μm to 50 μm;
   B) a fibre length within the range from 0.3 to 3.0 mm; and
   C) a specific fibre weight within the range from 1 dtex to 22 dtex.

17. A line routing device according to claim 15, wherein the flocking comprises at least one of the following materials:
   i) a polyester;
   ii) polyethylene terephthalate (PET); and
   iii) a polyamide.

18. A line routing device according to claim 15, wherein the flocking is applied by means of an adhesive comprising at least one of the following substances:
   I) xylene;
   II) 2-methoxy-1-methyl-ethyl acetate;
   III) glycolic acid-n-butyl ester; and
   IV) naphtha.

19. A guide element for receiving a line routing device, the guide element comprising two side walls and a support, wherein at least one section of a surface of the guide element has a flocking.

20. A guide element according to claim 19, wherein the flocking comprises fibres which fulfil at least one of the following specifications:
   A) a fibre diameter within the range from 10 μm to 50 μm;
   B) a fibre length within the range from 0.3 to 3.0 mm; and
   C) a specific fibre weight within the range from 1 dtex to 22 dtex.

21. A guide element according to claim 19, wherein the flocking comprises at least one of the following materials:
   i) a polyester;
   ii) polyethylene terephthalate (PET); and
   iii) a polyamide.

22. A guide element according to claim 19, wherein the flocking is applied by means of an adhesive comprising at least one of the following substances:
   I) xylene;
   II) 2-methoxy-1-methyl-ethyl acetate;
   III) glycolic acid-n-butyl ester; and
   IV) naphtha.

* * * * *